United States Patent [19]

Van Den Enden

[11] Patent Number: 5,504,633
[45] Date of Patent: Apr. 2, 1996

[54] APPARATUS, HAVING A VARIABLE EQUALIZER, FOR REPRODUCING A DIGITAL SIGNAL FROM A RECORD CARRIER

[75] Inventor: Gijsbert J. Van Den Enden, Eindhoven, Netherlands

[73] Assignee: U.S. Philips Corporation, New York, N.Y.

[21] Appl. No.: 342,684

[22] Filed: Nov. 21, 1994

Related U.S. Application Data

[63] Continuation of Ser. No. 102,081, Aug. 4, 1993, abandoned.

[30] Foreign Application Priority Data

Aug. 6, 1992 [EP] European Pat. Off. ............. 92202427

[51] Int. Cl.$^6$ ............................. G11B 5/035; H03H 7/30
[52] U.S. Cl. ............................................ 360/65; 375/230
[58] Field of Search ................................. 360/65; 375/12, 375/14, 230, 231, 232

[56] References Cited

U.S. PATENT DOCUMENTS

| | | | |
|---|---|---|---|
| 4,615,037 | 9/1986 | Adler | 360/65 |
| 4,888,808 | 12/1989 | Ishikawa et al. | 351/103 |

FOREIGN PATENT DOCUMENTS

| | | |
|---|---|---|
| 0332079 | 9/1989 | European Pat. Off. |
| 0387813 | 9/1990 | European Pat. Off. |
| 0454445 | 10/1991 | European Pat. Off. |

OTHER PUBLICATIONS

"Magnetic Recording", vol. II Computer Data Storage, By C. D. Mee and E. D. Daniel, pp. 215–224. 1988.

*Primary Examiner*—W. Chris Kim
*Attorney, Agent, or Firm*—Leroy Eason

[57] ABSTRACT

An arrangement for reproducing a digital signal from a track on a record carrier includes a read head for reading the signal from the track, and a variable equalizer adapted to equalizer transmission characteristics of a transmission path, including a recording channel up to the variable equalizer, in response to first and second control signals. The first control signal (HF) has a relation with high frequency losses in a magnitude transmission characteristic of the transmission path, and the second control signal (PHI) has a relation with a difference in delay caused by the transmission path between low frequency signals and high frequency signal in an operating frequency range of the transmission path. The variable equalizer has a finite impulse response filter unit, which includes a delay line unit having a number of N taps, a multiplier unit for multiplying a signal present at the n-th tap of the delay line unit by a multiplication factor a(n) and for supplying the multiplier signal to a signal combiner. The variable equalizer also has a multiplication factor generator unit for generating the multiplication factors a(n) in response to the first and second control signals.

12 Claims, 13 Drawing Sheets

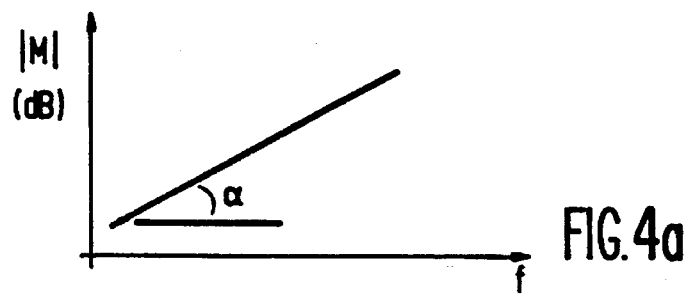
FIG.4a
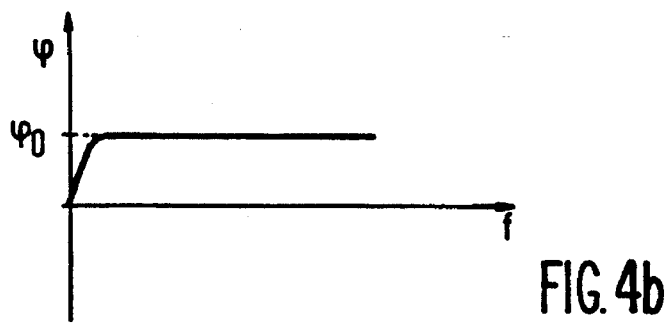
FIG.4b
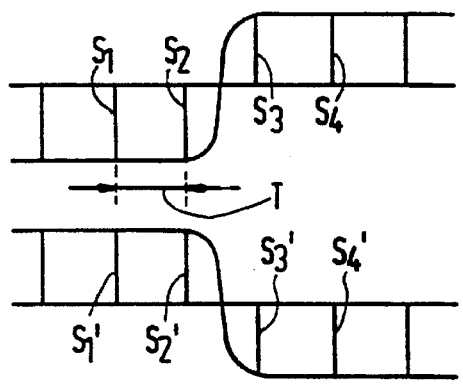
```
0  0  0  1
              FIG.5a
0  1  1  1
1  1  1  0
              FIG.5b
1  0  0  0
```
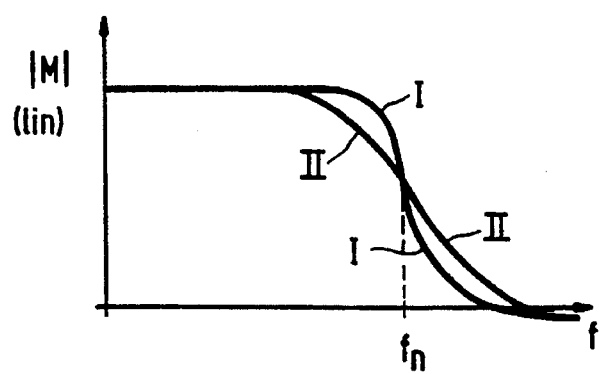
FIG.7

Area : 45 - -45

| | | | | | |
|---|---|---|---|---|---|
| A1( 0) = 119.0000 | A2( 0) = 10.4805 | A3( 0) = 0.3750 | A4( 0) = -0.4074 |
| A1( 1) = 124.0000 | A2( 1) = 3.3047 | A3( 1) = 0.6875 | A4( 1) = -0.9047 |
| A1( 2) = 164.0000 | A2( 2) = -69.6953 | A3( 2) = 0.7813 | A4( 2) = -1.1111 |
| A1( 3) = 137.0000 | A2( 3) = -64.1680 | A3( 3) = -0.2813 | A4( 3) = 1.4041 |
| A1( 4) = 134.0000 | A2( 4) = 37.4375 | A3( 4) = 1.6250 | A4( 4) = 0.4769 |
| A1( 5) = 255.0000 | A2( 5) = 0.0000 | A3( 5) = 0.0000 | A4( 5) = 0.0000 |
| A1( 6) = 134.0000 | A2( 6) = 37.4375 | A3( 6) = -1.6250 | A4( 6) = -0.4769 |
| A1( 7) = 137.0000 | A2( 7) = -64.1680 | A3( 7) = 0.2813 | A4( 7) = -1.4041 |
| A1( 8) = 164.0000 | A2( 8) = -69.6953 | A3( 8) = -0.7813 | A4( 8) = 1.1111 |
| A1( 9) = 124.0000 | A2( 9) = 3.3047 | A3( 9) = -0.6875 | A4( 9) = 0.9047 |
| A1(10) = 119.0000 | A2(10) = 10.4805 | A3(10) = -0.3750 | A4(10) = 0.4074 |

FIG.11a

Area : 45 - 90

| | | | | | |
|---|---|---|---|---|---|
| B1( 0) = | 121.0000 | B2( 0) = | 8.0547 | B3( 0) = | 0.3750 | B4( 0) = | -0.4266 |
| B1( 1) = | 140.0000 | B2( 1) = | -19.8242 | B3( 1) = | 0.4063 | B4( 1) = | -0.4951 |
| B1( 2) = | 226.0000 | B2( 2) = | -174.8047 | B3( 2) = | -0.4688 | B4( 2) = | 1.0740 |
| B1( 3) = | 137.0000 | B2( 3) = | -78.3906 | B3( 3) = | -0.2656 | B4( 3) = | 1.8188 |
| B1( 4) = | 194.0000 | B2( 4) = | 73.2813 | B3( 4) = | 0.7031 | B4( 4) = | -0.8980 |
| B1( 5) = | 410.0000 | B2( 5) = | -66.8242 | B3( 5) = | -3.0781 | B4( 5) = | 0.6682 |
| B1( 6) = | 90.0000 | B2( 6) = | 58.4688 | B3( 6) = | -1.0156 | B4( 6) = | -0.5882 |
| B1( 7) = | 152.0000 | B2( 7) = | -160.7148 | B3( 7) = | -0.1250 | B4( 7) = | 0.8573 |
| B1( 8) = | 177.0000 | B2( 8) = | -104.3906 | B3( 8) = | -1.1563 | B4( 8) = | 2.0213 |
| B1( 9) = | 97.0000 | B2( 9) = | 36.5000 | B3( 9) = | -0.2031 | B4( 9) = | 0.3114 |
| B1(10) = | 98.0000 | B2(10) = | 36.7773 | B3(10) = | 0.0313 | B4(10) = | -0.0652 |

FIG.11b

Area : -45 - -90

| | | | | | |
|---|---|---|---|---|---|
| C1( 0)= | 98.0000 | C2( 0)= | 36.7773 | C3( 0)= | -0.0313 | C4( 0)= | 0.0652 |
| C1( 1)= | 97.0000 | C2( 1)= | 36.5000 | C3( 1)= | 0.2031 | C4( 1)= | -0.3114 |
| C1( 2)= | 177.0000 | C2( 2)= | -104.3906 | C3( 2)= | 1.1563 | C4( 2)= | -2.0213 |
| C1( 3)= | 152.0000 | C2( 3)= | -160.7148 | C3( 3)= | 0.1250 | C4( 3)= | -0.8573 |
| C1( 4)= | 90.0000 | C2( 4)= | 58.4688 | C3( 4)= | 1.0156 | C4( 4)= | 0.5882 |
| C1( 5)= | 410.0000 | C2( 5)= | -66.8242 | C3( 5)= | 3.0781 | C4( 5)= | -0.6682 |
| C1( 6)= | 194.0000 | C2( 6)= | 73.2813 | C3( 6)= | -0.7031 | C4( 6)= | 0.8980 |
| C1( 7)= | 137.0000 | C2( 7)= | -78.3906 | C3( 7)= | 0.2656 | C4( 7)= | -1.8188 |
| C1( 8)= | 226.0000 | C2( 8)= | -174.8047 | C3( 8)= | 0.4688 | C4( 8)= | -1.0740 |
| C1( 9)= | 140.0000 | C2( 9)= | -19.8242 | C3( 9)= | -0.4063 | C4( 9)= | 0.4951 |
| C1(10)= | 121.0000 | C2(10)= | 8.0547 | C3(10)= | -0.3750 | C4(10)= | 0.4266 |

```
Area : 45 - -45
A3( 0)=   128.0000    A4( 0)=    0.3125
A3( 1)=   130.0000    A4( 1)=    0.0000
A3( 2)=   128.0000    A4( 2)=    0.5469
A3( 3)=   130.0000    A4( 3)=    0.0000
A3( 4)=   128.0000    A4( 4)=    1.6250
A3( 5)=   255.0000    A4( 5)=    0.0000
A3( 6)=   128.0000    A4( 6)=   -1.6250
A3( 7)=   130.0000    A4( 7)=    0.0000
A3( 8)=   128.0000    A4( 8)=   -0.5469
A3( 9)=   130.0000    A4( 9)=    0.0000
A3(10)=   128.0000    A4(10)=   -0.3125

Area : 45 - 90
B3( 0)=   137.0000    B4( 0)=    0.1875
B3( 1)=   133.0000    B4( 1)=   -0.0469
B3( 2)=   144.0000    B4( 2)=    0.3125
B3( 3)=   133.0000    B4( 3)=   -0.0469
B3( 4)=   178.0000    B4( 4)=    0.9063
B3( 5)=   407.0000    B4( 5)=   -3.0313
B3( 6)=    78.0000    B4( 6)=   -0.9063
B3( 7)=   133.0000    B4( 7)=   -0.0469
B3( 8)=   112.0000    B4( 8)=   -0.3125
B3( 9)=   133.0000    B4( 9)=   -0.0469
B3(10)=   119.0000    B4(10)=   -0.1875

Area : -45 - -90
C3( 0)=   119.0000    C4( 0)=    0.1875
C3( 1)=   133.0000    C4( 1)=    0.0469
C3( 2)=   112.0000    C4( 2)=    0.3125
C3( 3)=   133.0000    C4( 3)=    0.0469
C3( 4)=    78.0000    C4( 4)=    0.9063
C3( 5)=   407.0000    C4( 5)=    3.0313
C3( 6)=   178.0000    C4( 6)=   -0.9063
C3( 7)=   133.0000    C4( 7)=    0.0469
C3( 8)=   144.0000    C4( 8)=   -0.3125
C3( 9)=   133.0000    C4( 9)=    0.0469
C3(10)=   137.0000    C4(10)=   -0.1875
```

FIG. 13b

APPARATUS, HAVING A VARIABLE EQUALIZER, FOR REPRODUCING A DIGITAL SIGNAL FROM A RECORD CARRIER

This is a continuation of application Ser. No. 08/102,081, filed Aug. 4, 1993 abandoned.

BACKGROUND OF THE INVENTION

The invention an arrangement for reproducing a digital signal from a record carrier, comprising variable equalizer means, the variable equalizer means comprising digital finite impulse response filter means. Such an arrangement is known from European patent application no. 387,813 A2.

In the known arrangement equalization is realized by varying the filter parameters in response to a control signal supplied to a control signal input of the variable equalizer means, such that the magnitude of the filter response is increased or decreased.

The generation of the control signal is realized in control signal generator means. In the known arrangement the signal from the equalizer filter means is applied in digital form to a dam processing circuit which includes a detection circuit. The detection circuit is adapted to detect the bit error rate in the digital signal read out. A control signal is generated in response to the error rate, which control signal is applied to the control signal input of the equalizer filter means, so as to vary the filter parameters such that the bit error rate is minimized.

European patent Application No. 91203350.3 describes an equalization of magnitude and phase, on the basis of a first and a second control signal respectively. Further, European patent Application No. 92202428.6 filed at the same date as the European Patent application corresponding to the present application European Patent Application No. 92202427.8) describes some ways in which the first and the second control signals can be derived.

SUMMARY OF THE INVENTION

The invention has for its object to provide for variable equalizer means that realize an equalization of magnitude and phase on the basis of the first and second control signal.

The arrangement in accordance with the invention for reproducing a digital signal from a track on a record carrier, the arrangement comprising read means including a read head, for reading a signal from the track, variable equalizer means, having an input coupled to an output of the read means, first and second control signal inputs for receiving a first and a second control signal respectively and an output for supplying an equalized output signal in response to the first and the second control signal, the variable equalizer means being adapted to equalize the transmission characteristic of the transmission path including the recording channel up to the input of the variable equalizer means in response to the first and the second control signal, the first control signal having a relation with the high frequency losses in the magnitude transmission characteristic of the transmission path and the second control signal having a relation with the difference in delay caused by the transmission in said transmission path between the low frequency signals and high frequency signals in the operating frequency range of the transmission path, the variable equalizer means comprising digital filter means, equalizer control signal generator means having a first and a second output for supplying the first and second control signal respectively, which first and second outputs are coupled to the first and second control signal input respectively of the equalizer means, an output terminal coupled to the output of the variable equalizer means for supplying the digital signal, is characterized in that the variable equalizer means comprise finite impulse response filter means, the FIR filter means comprising delay line means having a number of N taps, multiplier means for multiplying a signal present at the n-th tap of the delay line means by a multiplication factor $a(n)$ and for supplying the multiplied signal to signal combining means, an output of the signal combining means being coupled to the output of the variable equalizer means, the variable equalizer means further comprising multiplication factor generator means for generating the multiplication factors $a(n)$ in response to the first and second control signal.

In a first embodiment, the arrangement of claim 1 may be further characterized in that the multiplication factor generator means comprising multiplication factor calculating means, the said multiplication factor calculating means being adapted to calculate at least a number of the N multiplication factors $a(n)$ in accordance with the following formula:

$a(n)=A1(n)+A2(n)*HF+A3(n)*PHI+A4(n)*HF*PHI$, for PHI having a value lying in a first value range, where HF is the value of the first control signal, PHI is the value of the second control signal, $A1(n)$, $A2(n)$, $A3(n)$ and $A4(n)$ being constants for each multiplication factor $a(n)$, memory means being available for storing at least a number of said constants, and where n lies in a range from 0 to N−1 inclusive.

In this situation, the variable equalizer filter means comprise a single FIR filter means, and the multiplication factors (or coefficients) for the FIR filter means are computed using the formula given. There are situations where, in the value range of occurrence for the second control signal, the filter coefficients can be calculated using one set of constants. If the value range of occurrence for the second control signal is larger, it may become necessary to use a second, or even a third, set of constants in the formula given, for calculating the filter coefficients.

In a second embodiment, the arrangement of claim 1 may be further characterized in that the multiplication factor calculating means being further adapted to calculate the multiplication factors $a(n)$ in accordance with the following formula:

$a(n)=C1(n)+C2(n)*HF+C3(n)*PHI+C4(n)*HF*PHI$, for PHI having a value lying in a third value range not overlapping the first and the second value range, where $C1(n)$, $C2(n)$, $C3(n)$ and $C4(n)$ are constants for each multiplication factor $a(n)$, the memory means being further adapted to store at least a number of said constants $C1(n)$ to $C4(n)$.

In this situation, the variable equalizer filter means comprise a first and a second FIR filter means. The first FIR filter means is controlled by the first control signal only, and the second FIR filter means is controlled by the second control signal only. The coefficients for the FIR filter means are computed using the formulae given. In the same way as explained above, there are situations where, in the value range of occurrence for the second control signal, the filter coefficients for the second FIR filter means can be calculated using one set of constants. Again, if the value range of occurrence for the second control signal becomes larger, it may become necessary to use a second, or even a third set of constants to calculate the coefficients for the second FIR filter means.

BRIEF DESCRIPTION OF THE DRAWINGS

These and other aspects of the invention will be apparent from and elucidated with reference to the embodiments described hereafter, in which

FIGS. 4a and 4b show the magnitude and the phase, respectively, of the variable equalizer means as a function of frequency;

FIGS. 5a and 5b show signals read out in response to a positive and a negative going transition in the magnetization, respectively;

FIG. 7 shows two examples of a noise shaping filter used in a magnetic reproduction channel.

FIGS. 11a–11c show tables with the constants necessary for calculating the multiplication factors;

FIGS. 13a and 13b show tables with the constants necessary for calculating the multiplication factors for the second embodiment.

DESCRIPTION OF THE PREFERRED EMBODIMENTS

Figure 1:
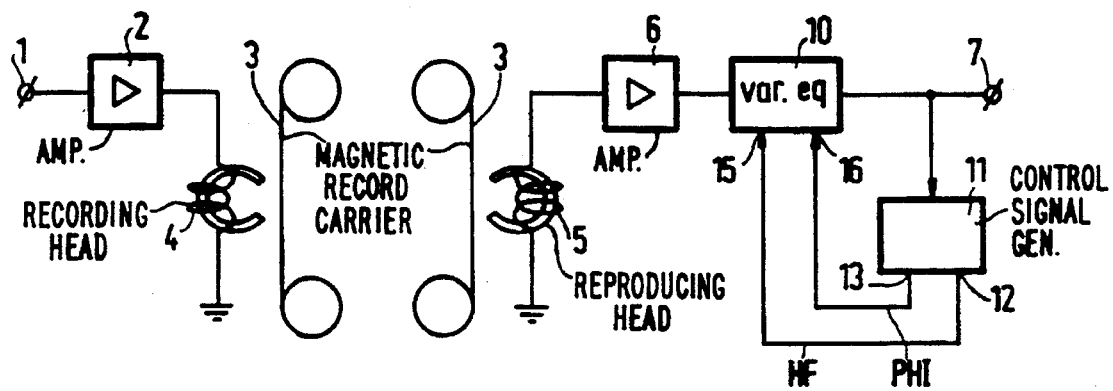
FIG. 1 shows a magnetic recording/reproduction channel.

FIG. 1 shows the recording/reproduction channel, where an input signal is applied to an input terminal 1, and is recorded, after pre-amplification in a recording amplifier 2 on a magnetic record carrier 3 by means of a recording head 4. Reproduction is carried out by means of a reproducing head 5, so that the signal reproduced can be amplified in an amplifier 6, after which the signal is applied to an input of variable equalizer means 10. The reproducing arrangement further comprises equalizer control signal generator means 11. The equalizer control signal generator means have an input coupled to the output of the variable equalizer means 10 and have a first and a second output 12 and 13 respectively, for supplying a first control signal HF to a first control signal input 15 of the variable equalizer means 10, and a second control signal PHI to a second control signal input 16 the equalizer means 10.

It should be noted that the input of the control signal generator means 11 need not necessarily be coupled to the output of the variable equalizer, but can, if needed, be coupled to a point earlier in the reproduction channel.

The variable equalizer means 10 is adapted to equalize the transmission characteristic of the transmission path including the recording channel up to the input of the variable equalizer means 10 in response to the first and the second control signal. The first control signal has a relation with the high frequency losses in the magnitude transmission characteristic of the transmission path. The first control signal is thus related to the declination angle $\alpha$ of the magnitude curve of FIG. 2a. The second control signal has a relation with the difference in delay caused by the transmission in said transmission path between the low frequency signals and high frequency signals in the operating frequency range of the transmission path.

This can be explained as follows.

The transmission characteristic of the recording/reproduction channel can be measured by applying an impulse signal to the input terminal 1 and measuring the signal obtained at the input of the variable equalizer means 10, after having recorded the impulse signal on the record carrier 3, and reproduction of the recorded signal.

Figure 2A:
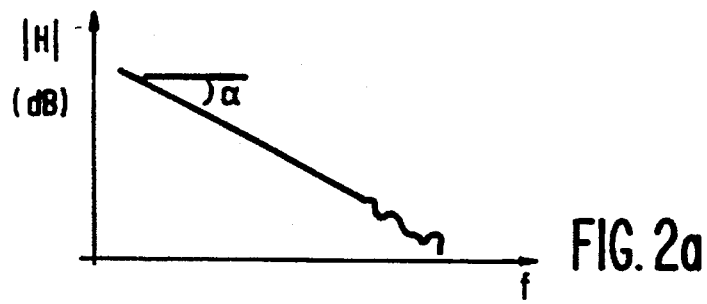
FIGS. 2a and 2b show the magnitude and the phase, respectively, as a function of frequency of the recording channel.

FIG. 2a shows the magnitude transmission characteristic of the transmission path including the recording channel, up to the input of the variable equalizer means 10, expressed in dB, as a function of frequency plotted on a linear scale. The characteristic is a more or less straight line which descends for increasing frequencies. The declination angle of the line is indicated by $\alpha$.

Figure 2B:
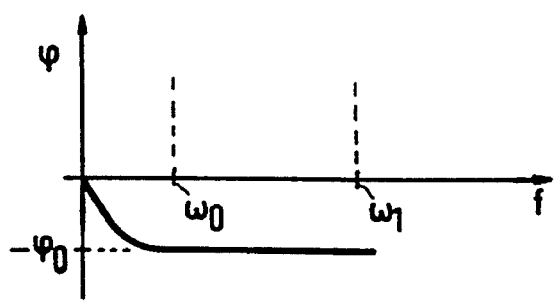

FIG. 2b shows the phase difference, as a function of frequency, between the actual response signal present at the input of the variable equalizer means 10 and the ideal response signal at the said input, which response signal is the signal in response to the above identified impulse signal applied to the input 1. The curve shows a constant phase difference $\phi = -\phi_0$ as a function of frequency. More generally, the phase difference equals $\phi = \phi_0 - \omega T_c$, where $T_c$ is a delay which is constant for all frequencies.

Figures 3A, 3B:
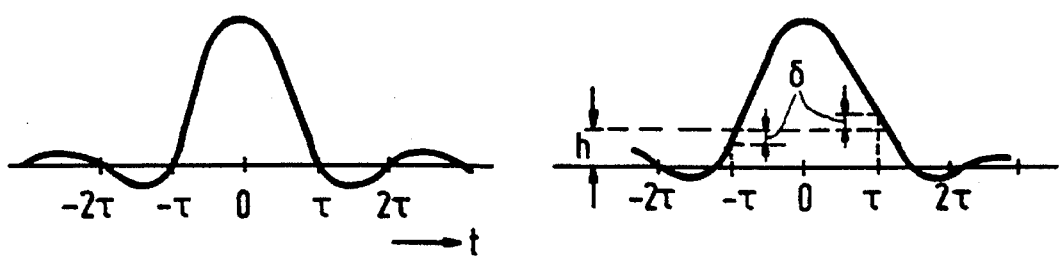
FIGS. 3a and 3b show an ideal impulse response signal and an actual impulse response signal respectively.

The delay for a low frequency signal having a frequency $\omega_0$ is defined as $-\phi/\omega_0$. This delay thus equals $\phi_0/\omega_0 + T_c$. The delay for a high frequency signal having a frequency $\omega_1$ equals $\phi_0/\omega_1 + T_c$. The difference in delay thus equals $\phi_0/\omega_0 - \phi_0/\omega_1$. The common delay of $T_c$ has disappeared and thus play no relevant role in the calculation. In the case where $\omega_1 = m \times \omega_0$, where m is larger than zero, the difference in delay equals $\phi_0\{(m-1)/m\}/\omega_0$. The difference in delay thus bears a relationship with the phase difference $-\phi_0$ given in FIG. 2b. The meaning of this difference in delay is, that low(er) frequencies are more delayed than high(er) frequencies. As a result, if the symmetric response given in FIG. 3a is to be expected, the asymmetric response of FIG. 3b will be the actual response. The ideal response of FIG. 3a shows a response having zero value at the sampling instants $t = \tau$ and $t = -\tau$. The actual response shows at the instant $t = \tau$ a non-zero value of $h + \delta$ and at the instant $t = -\tau$ a non-zero value of $h - \delta$. The symmetric component h in both non-zero values stems from the non-flat magnitude characteristic of FIG. 2a, and the non-symmetric component of $\delta$ and $-\delta$ in the values results from the phase difference $-\phi_0$ in FIG. 2b.

In response to the first control signal HF and the second control signal PHI, applied to the variable equalizer means 10, the equalizer means 10 realize a frequency response characteristic as regards magnitude and phase, such that it equalizes the transmission path. This means effectively, that the equalizer means realize a magnitude characteristic as a function of frequency as given in FIG. 4a. This characteristic is in the form of a substantially straight line which ascends for increasing frequencies. The inclination angle of the line is α. Further, the phase characteristic as a function of frequency of the variable equalizer means is as given in FIG. 4b. It realizes a phase difference of $\phi_0$.

As a result of the equalization, the magnitude characteristic will become a substantially horizontal line, and the phase difference will become zero for all frequencies, so that no difference in delay between the low(er) and the high(er) frequencies is present.

It should be noted that the arrangement can include a fixed equalizer (not shown) coupled in the reproduction channel between the reproduction head 5 and the input of the variable equalizer 10. Such fixed equalizer can compensate for the average HF loss, given by the angle α in FIG. 2a, so that the variable equalizer need to compensate for the deviations from that angle α only, which makes the variable equalizer simpler, and makes the equalization by the variable equalizer simpler.

European Application No. 9220248.6 filed on the same date as the present application show various embodiments of the control signal generator means 11 to obtain the first and the second control signal.

The derivation of the first and the second control signal in this application is based on the detection of step transitions in the magnetization on tape. When carrying out a full response detection during reproduction, a positive or negative going step transition results in a more or less ideal step response in the signal read from tape, such as given in FIGS. 5a and 5b, respectively. The deviation of the step response from the ideal response is an indication of the non-ideal character of the recording channel, as regards magnitude and phase.

In correspondence with the teachings of the European Application No. 9220248.6, the first control signal HF can be derived from the samples in the signal of FIGS. 5a or 5b in the following way.

In the case of a positive going transition, as per FIG. 5a, a value hf(t) that equal $(s_4-s_3)+(s_2-s_1)$ is calculated. In the case of the negative going transition as per FIG. 5b, the value hf(t) is calculated using the following formula:

$$-[(s_4'-s_3')+(s_2'-s_1')].$$

$s_1$ to $s_4$ and $s_1'$ to $s_4'$ are the values of the samples in the signals of FIGS. 5a and 5b that lie directly around the positive and negative going transition respectively. The samples have a spacing T in time which equals the bit time in the signal read from the tape. The samples can be obtained in a synchronous detection of the signal read out, but an asynchronous detection is equally well possible.

The first control signal HF is now obtained by integrating the hf(t) values for subsequently detected signal transitions.

In correspondence with the teachings of the aforesaid European Application No. 9220248.6, the second control signal PHI can be derived from the samples in the signal of FIGS. 5a or 5b in the following way.

In the case of a positive going transition, as per FIG. 5a, a value phi(t) is calculated using the formula:

$(s_4-s_3)-(s_2-s_1)$. In the case of the negative going transition as per FIG. 5b, the value phi(t) is calculated using the following formula:

$$-[(s_4'-s_3')-(s_2'-s_1')].$$

The second control signal PHI is now obtained by integrating the phi(t) values for subsequently detected signal transitions. Consequently PHI directly relates to the phase $\phi_0$ as per FIG. 2b.

The accuracy of the calculation of the second control signal as explained above, is not always sufficient. Further, low frequency components in the signal read out can deteriorate the generation of the second control signal. It is therefore sometimes advisable to derive the second control signal in a different way. In that situation, it suffices to calculate phi(t) using the formula: $-(s_3+s_2)$ for the positive going transition, and $s_3'+s_2'$ for the negative going transition. Again another way of deriving phi(t) is to sum all sample values $s_1$ to $s_4$ or $s_1'$ to $s_4'$.

Figure 6:
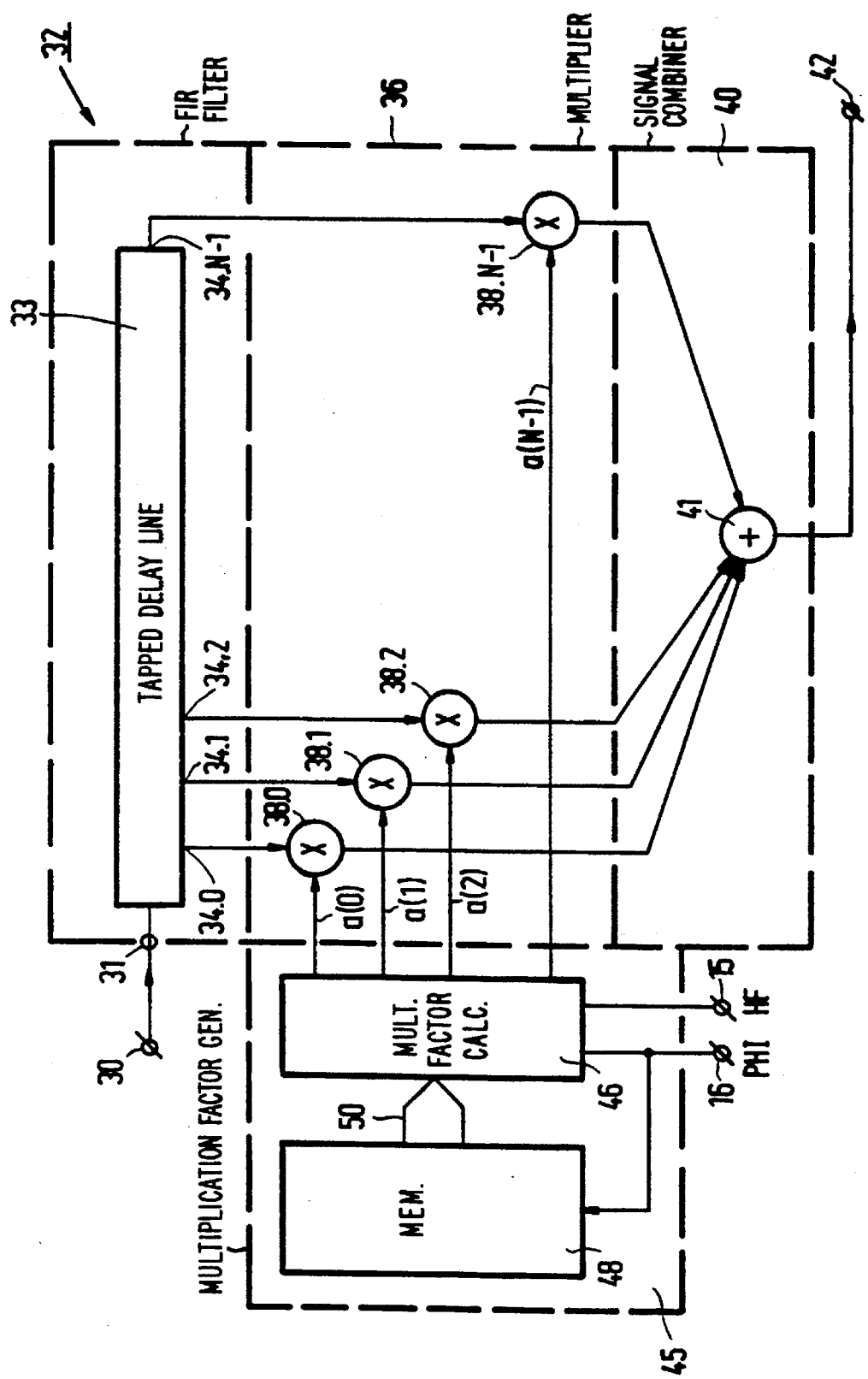
FIG. 6 shows a first embodiment of the variable equalizer means in accordance with the invention.

FIG. 6 shows a first embodiment of the variable equalizer means 10. The input 30 of the equalizer means is coupled to an input 31 of finite impulse response filter means 32. The FIR filter means 32 comprise a delay line 33 having N taps 34.0 to 34.N–1, multiplier means 36 having N multipliers 38.0 to 38.N–1 and signal combining means 40 in the form of an adder 41. An output of the adder is coupled to the output 42 of the equalizer means 10. The N taps are located equidistantly in time along the delay line 33. The delay time between the input 31 of the delay line 33 and the first tap 34.1 can be zero.

The N taps 34.0 to 34.N–1 are each coupled to a first input of a corresponding one of the multipliers 38.0 to 38.N–1. Each one multiplier 38.n of the N multipliers 38.0 to 38.N–1 receives a multiplication factor a(n) at a second input. Multiplication factor generator means 45 comprising multiplication factor calculating means 46 are present to calculate the multiplication factors a(n). The multiplication factor calculating means 46 calculate the multiplication factors a(n) in accordance with the following formulae:

a(n)=A1(n)+A2(n)*HF+A3(n)*PHI+A4(n)*HF*PHI, for PHI having a value lying in a first value range, a(n)=B1(n)+B2(n)*HF+B3(n)*PHI+B4(n)*HF*PHI, for PHI having a value lying in a second value range not overlapping the first value range, and a(n)=C1(n)+C2(n)*HF+C3(n)*PHI+C4(n)*HF*PHI, for PHI having a value lying in a third value range not overlapping the first and the second value range. n runs from 0 to N–1 inclusive.

The parameters HF and PHI are applied to the calculating means 46 via the control signal inputs 15 and 16 respectively.

A1(n), A2(n), A3(n), A4(n), B1(n), B2(n), B3(n), B4(n), C1(n), C2(n), C3(n) and C4(n) are constants for each multiplication factor a(n). Those constants are stored in a memory 48. The control signal input 16 is also coupled to the memory 48 so as to indicate which one of the three sets of constants should be used for the calculation of the multiplication factors a(n). The set of constants selected is applied to the calculating means 46 via the coupling 50. It should be noted that not all the constants need to be stored, because of the fact that sometimes multiplication factors can be derived from constants stored for other multiplication factors. This will be further explained at a later stage.

In order to realize, by means of the FIR filter 32, a filter characteristic as regards magnitude and phase that can equalize the transmission path including the recording channel up to the input of the variable equalizer means 10, the FIR filter 32 must be able to realize filters having magnitude characteristics as given in FIG. 4a, where α is the varying parameter, and phase characteristics as given in FIG. 4b, where $\phi_0$ is the varying parameter. Further, in order to realize a limitation in bandwidth, the filters 32 must realize a series arrangement of the filter given in FIGS. 4a and 4b and a noise shaping filter, such as the filter shown in FIG. 7. FIG.

7 only shows two possible curves for the magnitude of the noise shaping filter as a function of frequency. The phase as a function of frequency can be considered to be zero.

Various possibilities of noise shaping filters are known in the literature. Noise shaping filters have for their object to shape the signal read out and equalized, such that the signal-to-noise ratio is high and the intersymbol interference in the signal is low. FIG. 7 shows two examples of raised-cosine filters that can be used as noise-shaping filters. The magnitude curve I in FIG. 7 results in a relatively high signal-to-noise ratio, whereas the intersymbol interference is relatively high. This curve is e.g. the curve for a raised cosine filter of the type $\beta=2$. The magnitude curve II in FIG. 7 results in a relatively low signal-to-noise ratio, whereas the intersymbol interference is relatively low. This curve is e.g. the curve for a raised cosine filter of the type $\beta=3$. $f_n$ equals the Nyquist frequency, which equals half the bit frequency. The choice for the shaping filter is thus always a compromise between a high signal-to-noise ratio and a low sensitivity for intersymbol interference. Further, the choice of the shaping filter is determined by the possibility of obtaining a practical implementation of the equalization filter in a FIR filter having a limited number of taps. A discussion on shaping filters can amongst others be found in the book 'Magnetic recording, Vol II Computer data storage', editors C. Denis Mee and Eric D. Daniel, MacGraw-Hill Book Comp., 1988, chapter 4.6.3.2. on the pages 215 to 224.

Figure 8A:
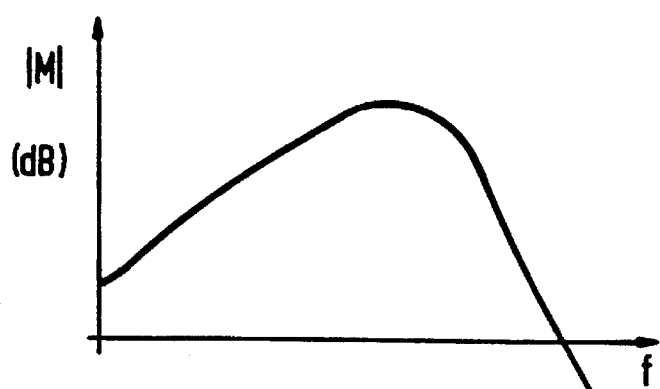
FIGS. 8a and 8b show examples of the filter characteristic, as regards magnitude (FIG. 8a) and phase (FIG. 8b) realized by the variable equalizer means.
Figure 8B:
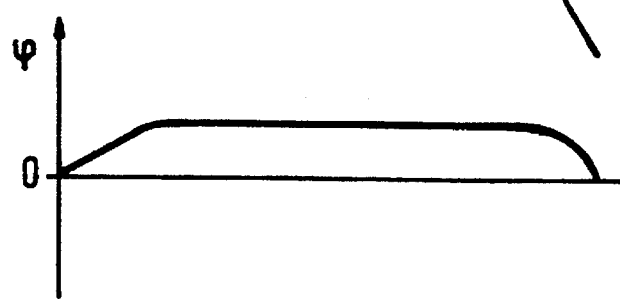
Figure 9:
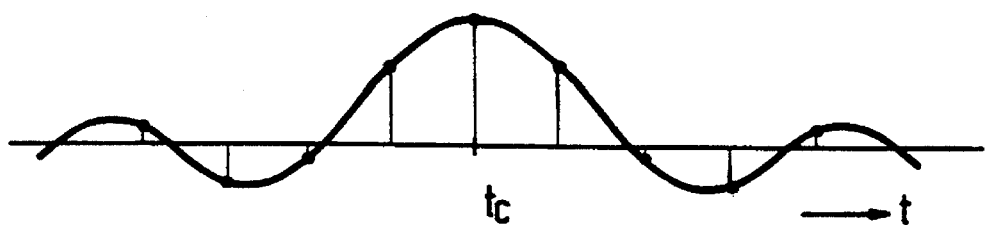
FIG. 9 shows an impulse response of the filter characteristic of FIGS. 8a and 8b.

As a result, the FIR filter 32 must realize a filter characteristic as given in FIGS. 8a and 8b. By carrying out an inverse fourier transform on the filter characteristic of FIGS. 8a and 8b, the impulse response of the filter 32 can be obtained. FIG. 9 shows an example of such an impulse response. The multiplication factors can be obtained by sampling the impulse response of FIG. 9 with the sampling frequency of the signals in the arrangement. The coefficient values namely exactly equal the values of the samples in the impulse response. If the sampling frequency equals the bit frequency, this means that the samples in the impulse response are a time interval T apart, T being the bit time. FIG. 9 shows the situation where the FIR filter has an odd number of taps. All samples of the impulse response, except one, lie symmetrically around the centre at $t=t_c$ of the impulse response. The said one sample lies exactly on $t_c$. In the situation where the FIR filter has an even number of taps, all samples of the impulse response are symmetrically around $t=t_c$.

FIGS. 10a–10f show the multiplication factors a(0) to a(5) for the first six taps of a FIR filter having eleven taps as a function of HF and PHI. The remaining multiplication factors a(6) to a(10) can be obtained as follows.

Suppose that the parameter PHI is so related to $\phi_0$ that, when $\phi_0$ is zero, that also PHI is zero. In that situation the following equations hold for the multiplication factors a(6, HF,PHI) to a(10,HF,PHI): a(6,HF,PHI)=a(4,HF,-PHI), a(7,HF,PHI)=a(3,HF,-PHI), a(8,HF,PHI)=a(2,HF,-PHI), a(9,HF,PHI)=a(1,HF,-PHI) and a(10,HF,PHI)=a(0,HF,-PHI). Designating a coefficient a(n) by a(n,HF,PHI) means that each coefficient a(n) is a function of HF and PHI.

However, if the parameter PHI is so related to $\phi_0$ that PHI equals a non-zero value $PHI_c$ when $\phi_0$ is zero, then the following equations hold for the multiplication factors a(6, HF,PHI) to a(10,HF,PHI): a(6,HF,PHI)=a(4,HF,2*$PHI_c$-PHI), a(7,HF,PHI)=a(3,HF,2*$PHI_c$-PHI), a(8,HF,PHI)=a(2, HF,2*$PHI_c$-PHI), a(9,HF,PHI)=a(1,HF,2*$PHI_c$-PHI) and a(0,HF,PHI)=a(10,HF,2*$PHI_c$-PHI). So, generally said, the following equation holds:

$$a(n,HF,PHI)=a(N-1-n,HF,2*PHI_c-PHI)$$

where $PHI_c$ is the value for PHI when $\phi_0$ equals zero.

As can be seen in FIGS. 10a–10f, the parameter PHI runs from −90° to +90°. PHI has in fact been calculated such that it corresponds to the phase $\phi_0$ of FIG. 4b).

Further, the parameter HF runs from 0.3 to 0.8. HF has in fact been calculated such that it corresponds to $\alpha$ in the following way:

$$\tan \alpha = 20.\pi.10^{-6}.HF/v.\ln(10),$$

where v is the relative velocity between the head and the record carrier.

It should be noted that the following relation exists for the curve given in FIG. 2a as a function of frequency:

$$H=\exp\{-\pi.p_{50}.f/v\},$$

where $p_{50}$ is the pulse width of a pulse at 50% of the pulse amplitude. HF will now be defined as $p_{50}$ in µm, or $HF=10^6.p_{50}$.

Further, $$\tan \alpha = 20 \log H/f,$$

as the transfer function H is expressed in dB in FIG. 2a.

More specific information about the parameter $p_{50}$ can be found in the book 'Magnetic recording, Vol. I (Technology)', editors C. Denis Mee and Eric D. Daniel, Mac-Graw-Hill Book Comp., 1987, chapter 2, more specifically chapter 2.1.2. and the pages 27, 37, 38 and 39.

Therefore, the above expressions for H and HF inserted in the formula for tan $\alpha$, this results in the above relationship between tan $\alpha$ and HF.

Figure 10A:
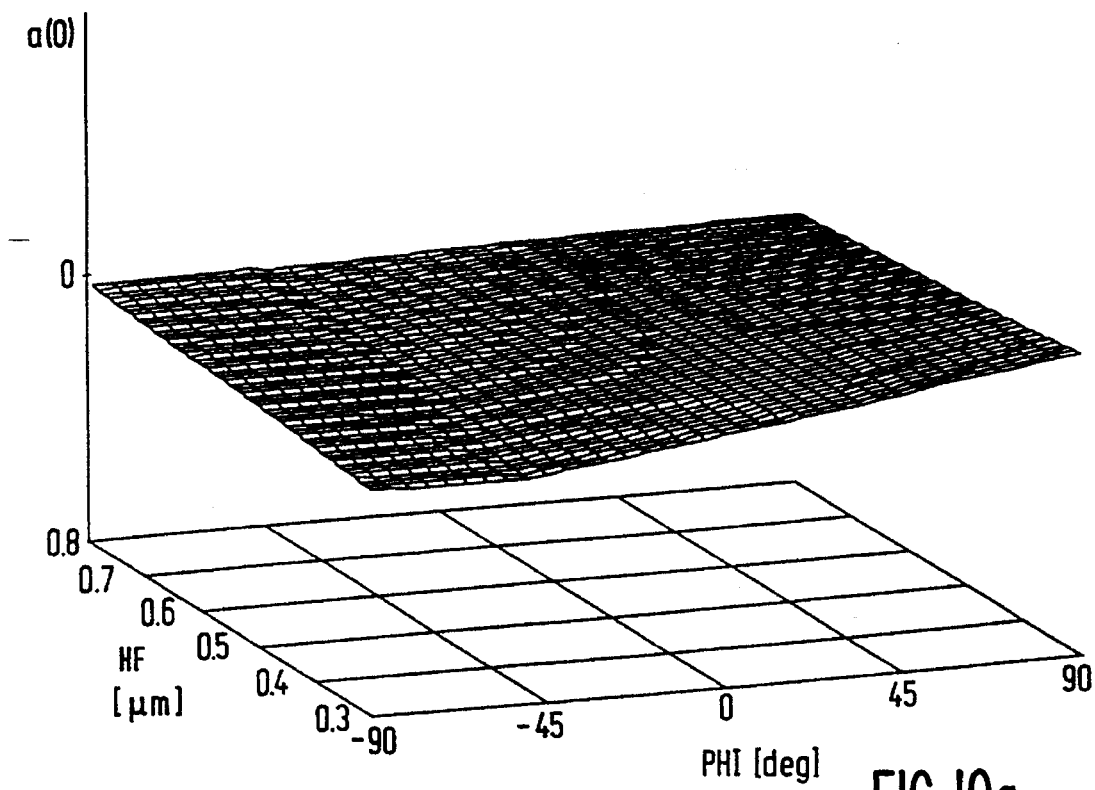
FIGS. 10a–10f show the behaviour of a number of multiplication coefficients as a function of HF and PHI.
Figure 10B:
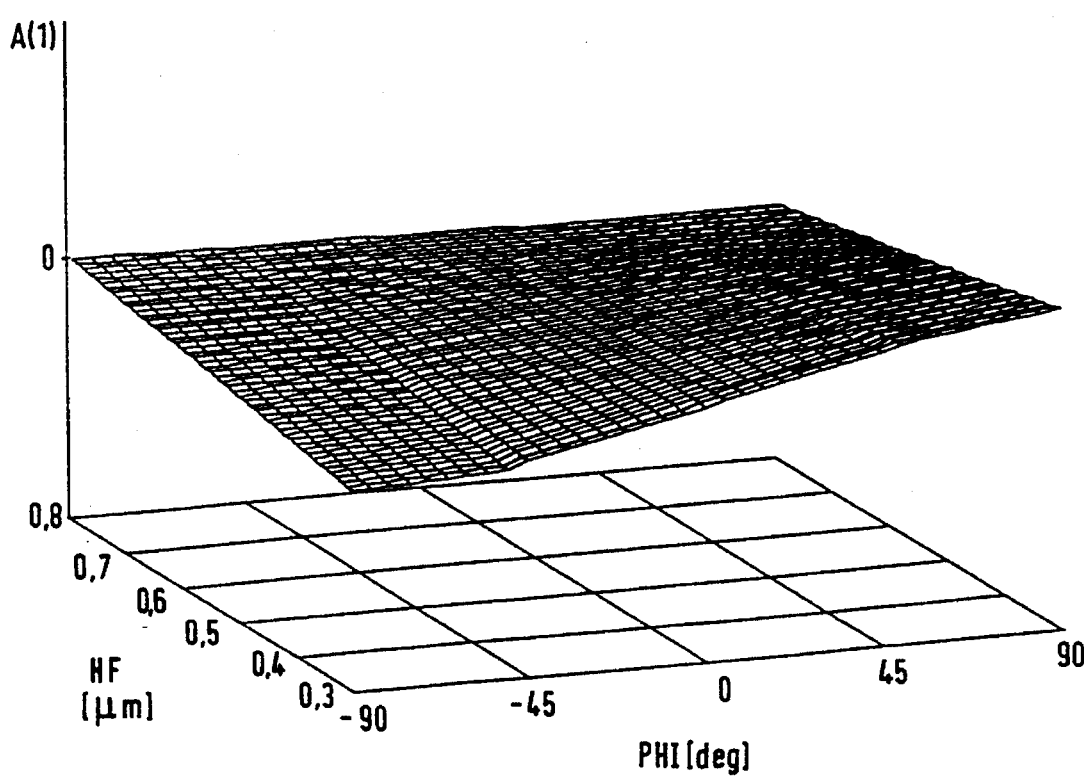
Figure 10C:
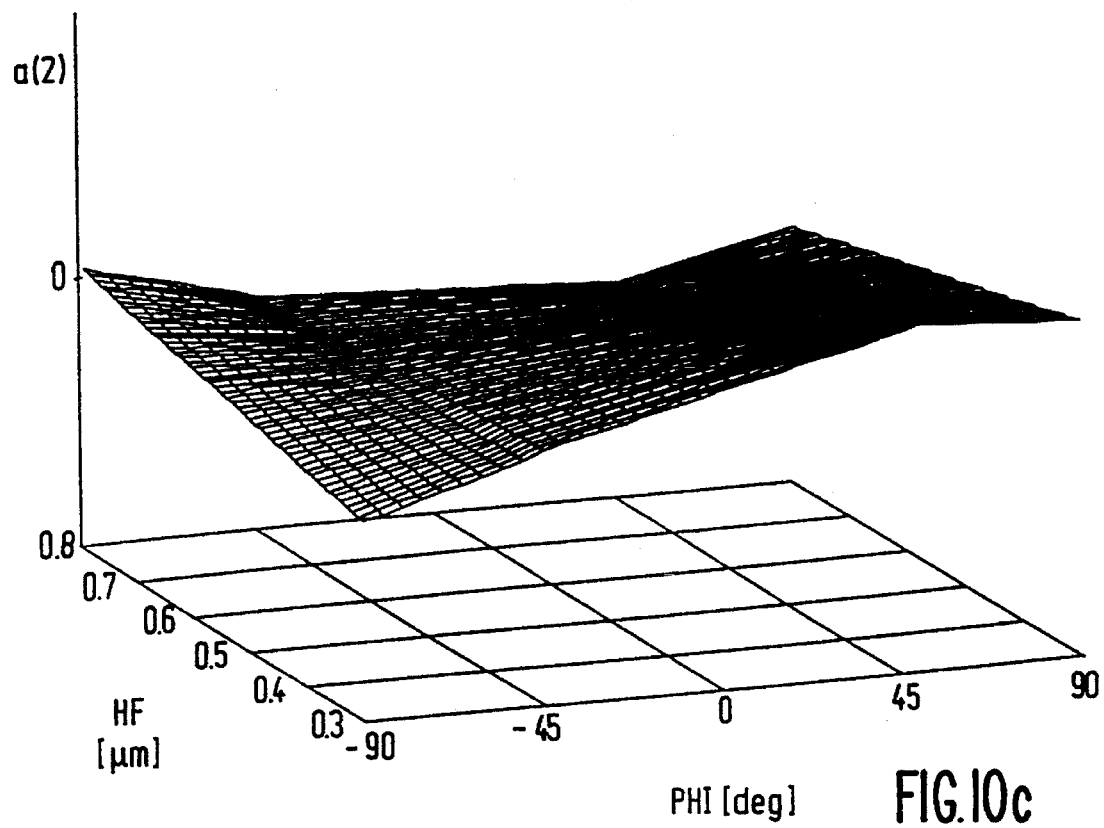
Figure 10D:
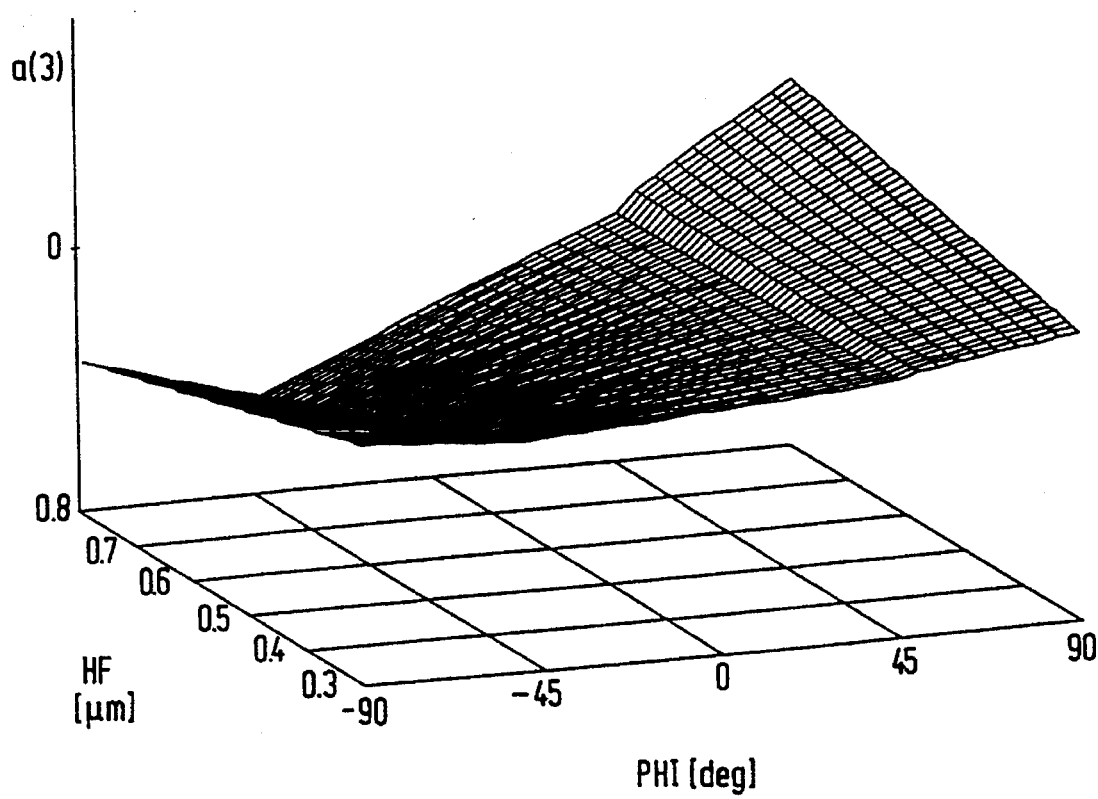
Figure 10E:
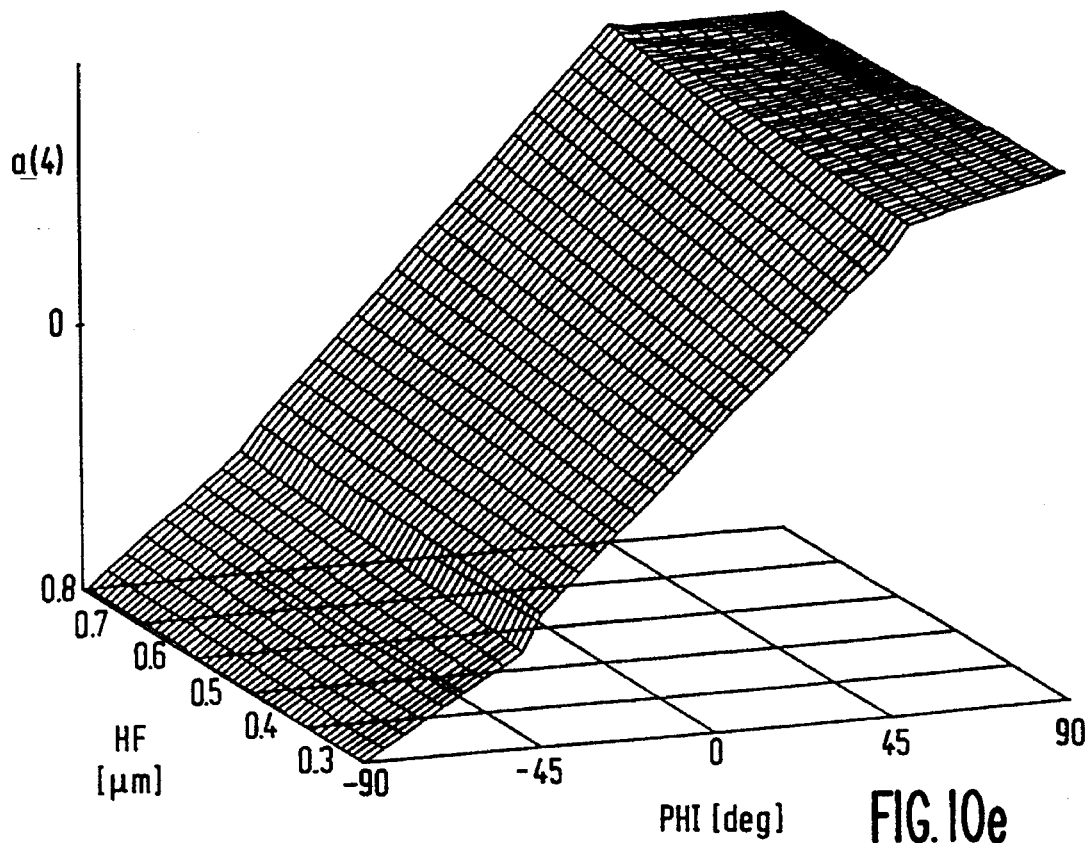
Figure 10F:
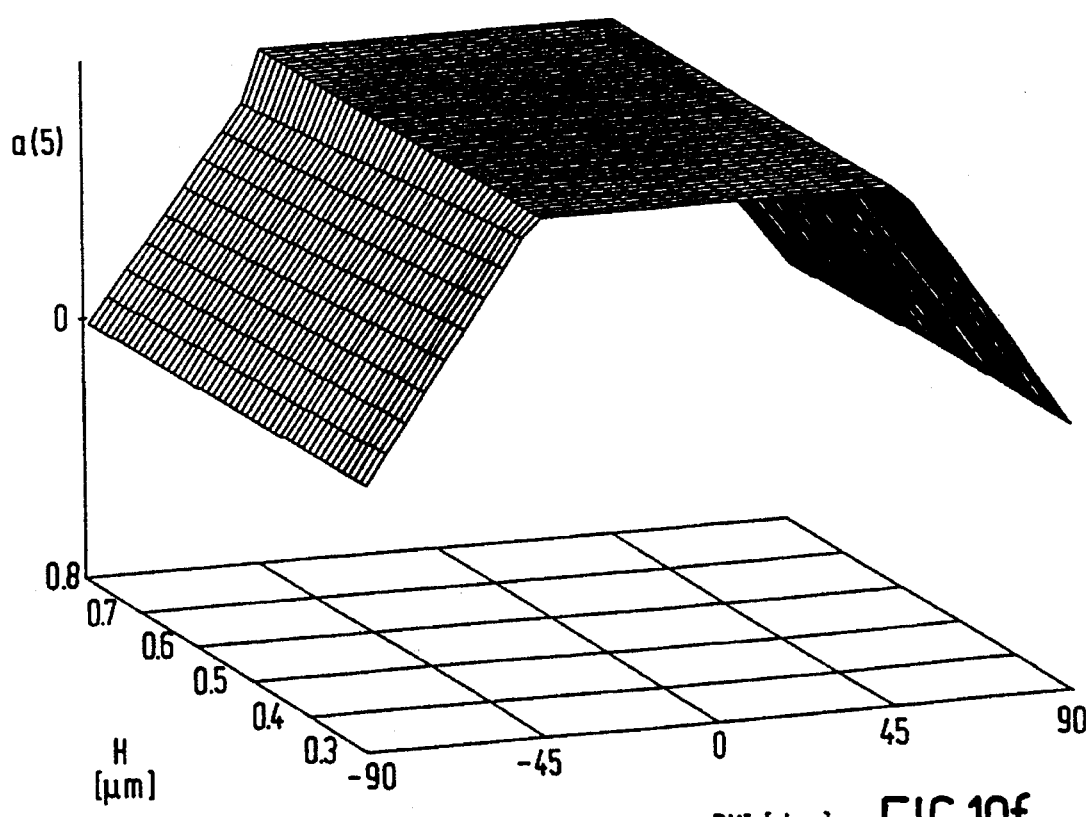

It should be noted that the multiplication factors are normalized by dividing the coefficients by the largest one. As can be seen in FIGS. 10a and 10b, which show the coefficients a(6) and a(5) respectively, the coefficient a(6) is the largest, for PHI lying in a value range between approximately 45° and −45°. Further, a(5) is the largest in the value range for PHI lying between approximately 45° and 90°. In the value range for PHI between −45° and −90° the coefficient a(7) is the largest.

The dependence of the coefficients on the parameters HF and PHI can be approximated by the following formulae:

$$a(n)=A1(n)+A2(n)*HF+A3(n)*PHI+A4(n)*HF*PHI, \quad (EQ.1)$$

for PHI having a value lying in a first value range between approximately −45° and 45°, $$a(n)=B1(n)+B2(n)*HF+B3(n)*PHI+B4(n)*HF*PHI, \quad (EQ.2)$$

for PHI having a value lying in a second value range between approximately 45° and 90°, and $$a(n)=C1(n)+C2(n)*HF+C3(n)*PHI+C4(n)*HF*PHI, \quad (EQ.3)$$

for PHI having a value lying in a third value range between −90° and approximately −45°.

An example of the three sets of constants A1(n) to A4(n), B1(n) to B4(n) and C1(n) to C4(n) is given in the table of FIGS. 11a–11c.

In response to the second control signal PHI having a value lying in one of the three value ranges, one of the three sets of constants stored in the memory 48 is selected and supplied to the calculation means 46 via the connection 50. The calculation means 46 calculates the multiplication factors a(0) to a(N–1) using the corresponding one of the formulae given above. The multiplication factors thus obtained are supplied to the multipliers 38.0 to 38.N–1, so that the required equalizer filter characteristic can be obtained.

It should be noted that in some applications, the parameter PHI only varies within the value range between –45° and 90°. In that situation there is no need to provide for a memory for storing the constants C1(n), C2(n), C3(n) and C4(n). In that situation, the multiplication factors are obtained using the equations (EQ.1) and (EQ.2) only.

In some situations, the parameter PHI will vary within the range of –45° and +45° only. In that situation, only the formula (EQ.1) suffices to calculate the filter parameters.

As said previously, not all the constants in the FIGS. 11a–11c need to be stored. In the range for PHI lying between –45° and 45°, only the constants for n=0 to n=5 need to be stored, as the multiplication factors a(6) to a(10) can be derived from the constants A1(0) to A1(5), A2(0) to A2(5), A3(0) to A3(5) and A4(0) to A4(5). This is visible in FIG. 11 as the table of constants for this range is symmetrical along the horizontal coefficient line for n=5. If an equalization in the range for PHI lying between 45° and 90° is aimed at, all B-constants are needed to calculate the multiplication factors. But for an additional equalization in the range for PHI between –45° and –90°, no further constants, such as the C-constants are needed, as the multiplication factors a(n) for PHI lying in this range can be obtained using the B-constants. This is again visible in FIG. 11, as the tables with the B-constants and the C-constants are symmetrical to each other, that is: Bi(j)=Ci(N–1–j), where i runs from 1 to 4 and j runs from 0 to N–1.

Figure 12:
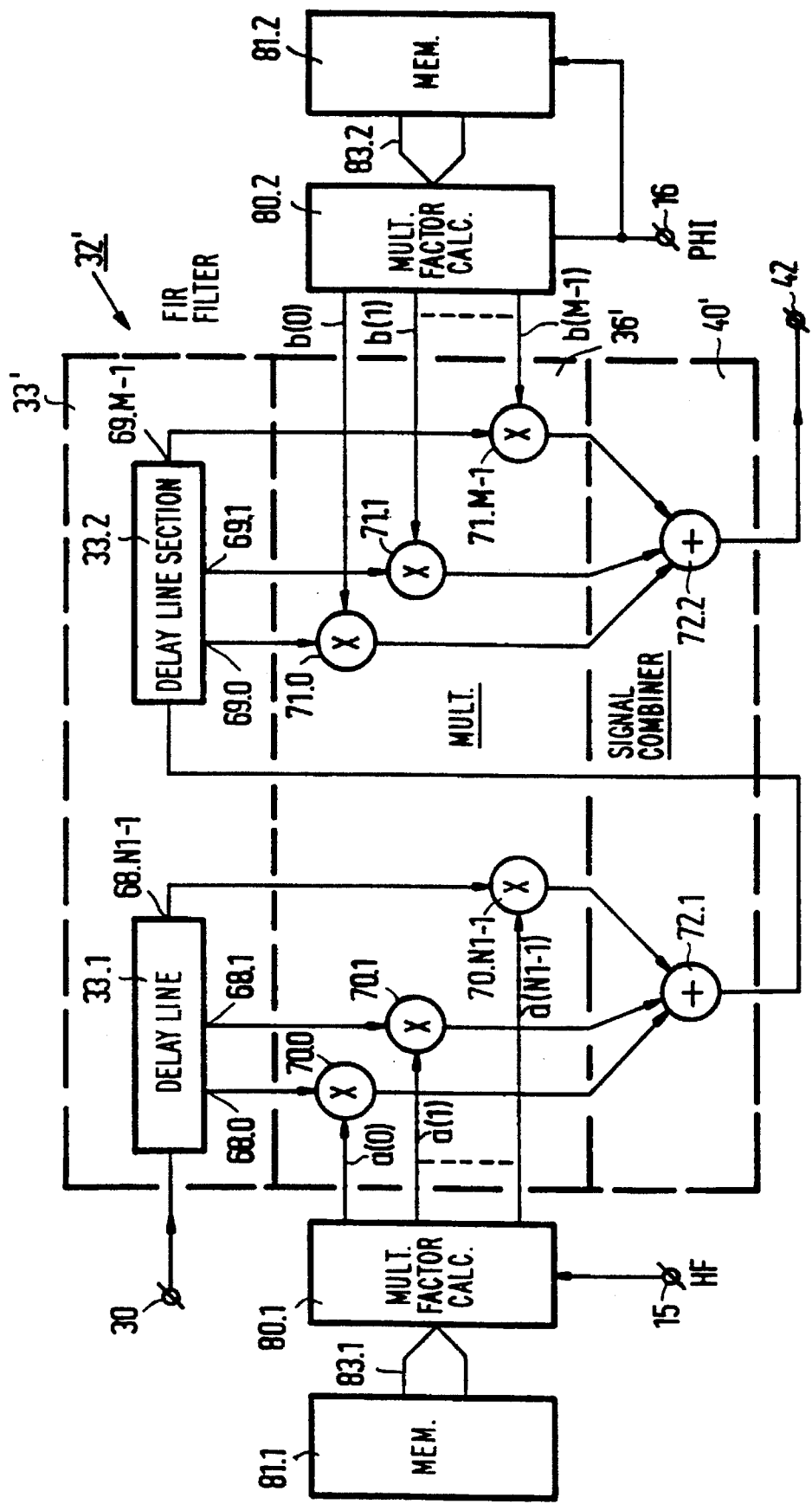
FIG. 12 shows a second embodiment of the variable equalizer means in accordance with the invention.

FIG. 12 shows a second embodiment of the equalizer filter means 10. The FIR filter 32' comprises delay line means 33' having a first delay line section 33.1 having N1 taps 68.0 to 68.N1–1 and a second delay line section 33.2 having N–N1 taps 69.0 to 69.M–1, where M=N–N1. Multiplier means 36' are present comprising N1 multipliers 70.0 to 70.N1–1, having a first input coupled to a corresponding one of the N1 taps of the delay line section 33.1. The multiplier means 36' further comprising M multipliers 71.0 to 71.M–1, and having a first input coupled to a corresponding one of the N–N1 taps of the second delay line section 33.2. The FIR filter 32' further comprises signal combination means 40' having a first signal combination unit 72.1 in the form of an adder, and a second signal combination unit 72.2 in the form of an adder. The outputs of the multipliers 70.0 to 70.N1–1 are coupled to corresponding inputs of the signal combination unit 72.1, an output of which is coupled to an input of the second delay line section 33.2. The outputs of the multipliers 71.0 to 71.M–1 are coupled to corresponding inputs of the signal combination unit 72.2, an output of which is coupled to the output 42 of the equalizer means 10. The input 30 of the equalizer means 10 is coupled to an input of the first delay line section 33.1

The taps 68.0 to 68.N1–1 are located equidistantly in time along the delay line section 33.1. The taps 69.0 to 69.M–1 are in the same way located equidistantly in time along the delay line section 33.2. The time delays between two subsequent taps in both delay line sections need not necessarily be the same. Further, the time delays between the inputs of the delay line sections and the first tap in each section can be zero.

The multipliers 70.0 to 70.N1–1 receive via a second input multiplication factors a(0) to a(N1–1) respectively.

Multiplication factor generator means are present comprising first multiplication factor calculating means 80.1 and second multiplication factor calculating means 80.2. The multiplication factor calculating means 80.1 calculate the N1 multiplication factors a(0) to a(N1–1) for the first delay line section 33.1 in accordance with the following formula:

$$a(n)=A1(n)+A2(n)*HF, \tag{EQ.4}$$

where n runs from 0 to N1–1 inclusive.

The multiplication factor calculating means 80.2 calculate the M(=N–N1) multiplication factors b(0) to b(M–1) for the second delay line section 33.2 in accordance with the following formulae:

$$b(n)=A3(n)+A4(n)*PHI, \tag{EQ.5}$$

for PHI having a value lying in a first value range, $$b(n)=B3(n)+B4(n)*PHI, \tag{EQ.6}$$

for PHI having a value lying in a second value range not overlapping the first value range, and $$b(n)=C3(n)+C4(n)*PHI, \tag{EQ.7}$$

for PHI having a value lying in a third value range not overlapping the first and the second value range.

HF is again the value of the first control signal, PHI is again the value of the second control signal, A1(n), A2(n), A3(n), A4(n), B3(n), B4(n), C3(n) and C4(n) are constants for each of the multiplication factors a(n) and b(n). A first memory unit 81.1 is available for storing at least a number of the constants A1(n) and A2(n). The constants A1(n) and A2(n) are supplied to the calculating means 80.1 via the coupling 83.1. A second memory unit 81.2 is available for storing at least a number of the constants A3(n), A4(n), B3(n), B4(n), C3(n) and C4(n).

The parameter HF is applied via the control input 15 to the calculating means 80.1, and the parameter PHI is applied to the calculating means 80.2 as well as to the memory 81.2 via the control signal input 16. The control signal input 16 is coupled to the memory 81.2 so as to indicate which one of the three sets of constants should be used for the calculation of the multiplication factors b(n). The set of constants selected is applied to the calculating means 80.2 via the coupling 83.2.

The derivation of the multiplication factors a(0) to a(N1–1) for the delay line section 33.1 and the multiplication factors b(0) to b(M–1) for the delay line section 33.2 can be done in the same way as described above for the embodiment of FIG. 6.

The derivation of the multiplication factors as described above for the embodiment of FIG. 6 is carried out a first time so as to obtain the N1 multiplication factors a(0) to a(N1–1) of the delay line section 33.1. As a boundary condition PHI is taken equal to zero, or equal to $PHI_c$, in the case that $PHI_c$ (which relates to $\phi_0=0$) is not equal to zero. The dependency of a(n) of HF as the only varying parameter can now be determined and lead to the formula EQ.4 with the parameters A1(n) and A2(n).

The derivation of the multiplication factors as described above for the embodiment of FIG. 6 is carried out a second time so as to obtain the M multiplication factors b(0) to b(M–1) for the second delay line section 33.2. The difference with the derivation described with reference to FIG. 6 is that the shaping filter should be left out in the derivation. If not, the embodiment of FIG. 12 would include twice the shaping filter which is not correct. Further, as a boundary condition, HF is taken equal to zero, assuming that HF equal to zero corresponds to α being equal to zero. If not, HF is taken equal to a certain value $HF_c$, where HF equal to $HF_c$ corresponds to α being equal to zero. The dependency of b(n) of PHI as the only varying parameter can now be determined and lead to the formulae EQ.5, EQ.6 and EQ.7. The constants for the formulae EQ.4 to EQ.7 can be found in FIG. 13.

Figure 13A:
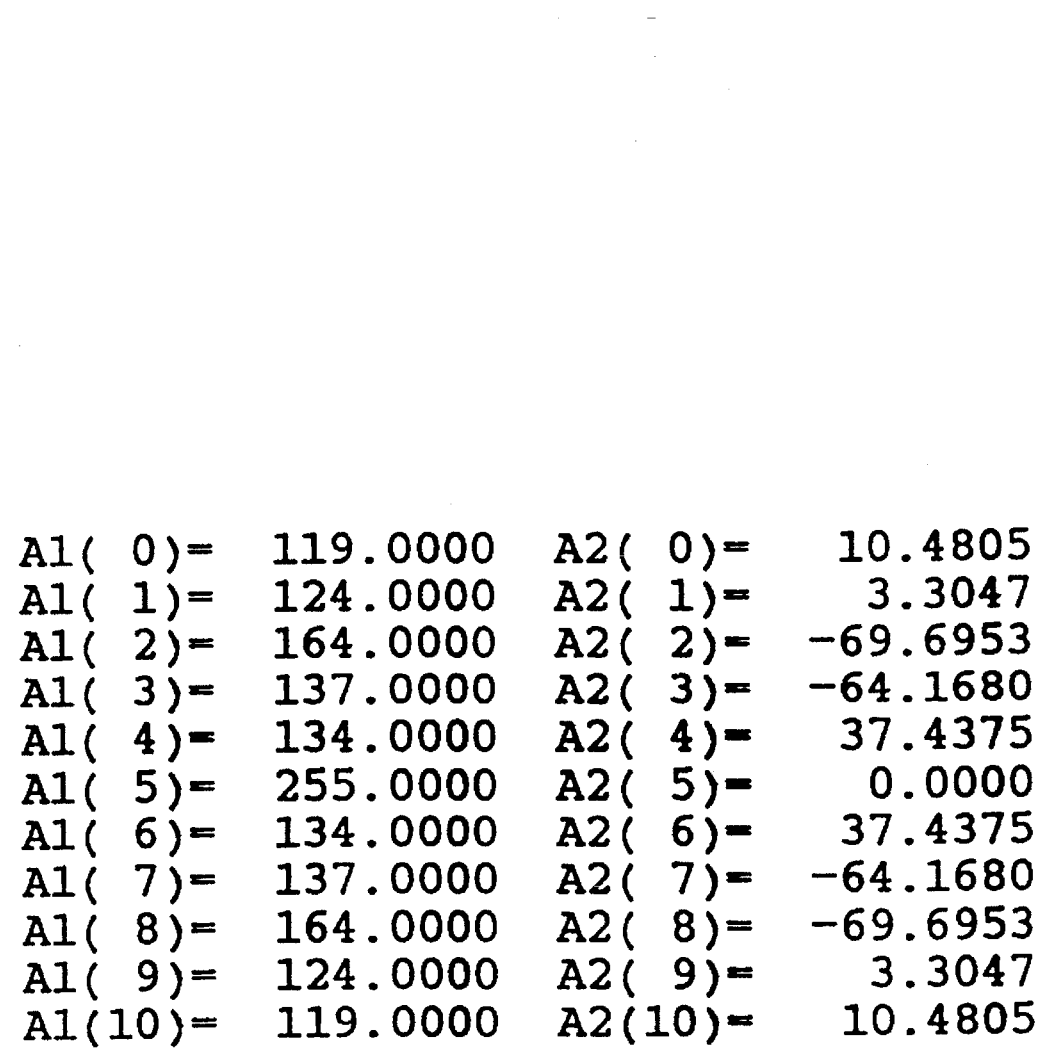

Comparison of the tables in FIGS. 11a–11c and 13a and 13b reveal that the constants A1(n) and A2(n) in the FIGS. 11a–11c equal the constants A1(n) and A2(n) in FIGS. 13a and 13b, which was to be expected. The constants A3(n), A4(n), B3(n), B4(n), C3(n) and C4(n) in FIGS. 13a and 13b are not equal to any of the other constants in FIGS. 11a–11c, for the reason that the shaping filter has been left out in the derivation of the multiplication factors for the filter section 33.2.

In the same way as mentioned above, it should be noted that in some applications, the parameter PHI only varies within the value range between −45° and 90°. In that situation there is no need to provide for a memory for storing the constants C3(n) and C4(n). In that situation, the multiplication factors b(1) to b(M) are obtained using the equations (EQ.5) and (EQ.6) only. It is even possible that PHI varies between −45° and 45° only. In that situation (EQ.5) suffices for the calculation of the filter coefficients.

It should be noted that in order to realize an equalization with a certain quality using the embodiment of FIG. 6, a FIR filter 32 with a certain length, and thus a certain number N of taps, is required. Using the embodiment of FIG. 12, in order to realize an equalization with the same quality as with the embodiment of FIG. 6 might require a total number of taps N1+M, which is larger than the number of taps N of the first embodiment.

I claim:

1. An apparatus for reproducing a digital signal which has been recorded on a track on a record carrier, the apparatus comprising:

read means for reading the recorded digital signal from the track;

equalizer control signal generator means for generating first and second control signals, the first control signal being related to high frequency losses in a magnitude transmission characteristic of a transmission path which includes the recording and reading of the digital signal, the second control signal being related to a delay difference resulting from a phase transmission characteristic of said transmission path between low and high frequency portions of an operating frequency range thereof;

variable equalizer means for equalizing the magnitude and phase transmission characteristics of said transmission path in response to said first and second control signals, and supplying an equalized output signal which is a reproduction of said digital signal; said variable equalizer means being coupled to said read means to receive the digital signal read from the track and being further coupled to said equalizer control signal generator means to receive said first and second control signals therefrom; said variable equalizer means having (a) finite impulse response filter means comprising:

(i) delay line means having a number N of taps, each nth tap providing an nth tap output signal, where $0 \leq n \leq N-1$;

(ii) multiplier means for multiplying each nth tap output signal by a multiplication factor a(n) to produce a multiplied nth tap output signal; and (iii) combining means coupled to said multiplier means for receiving and combining the multiplied output signals of all N taps; and (b) multiplication factor generating means for generating each of the multiplication factors a(n) as a summation of terms which at least include the products of said first and second control signals by respective constants.

2. The apparatus as claimed in claim 1, wherein said multiplication factor generator means comprises multiplication factor calculating means for determining at least a number of the N multiplication factors a(n) in accordance with the following relationship:

a(n)=A1(n)+A2(n)*HF+A3(n)*PHI+A4(n)*HF*PHI, for PHI having a value lying in a first value range, where HF is the value of the first control signal, PHI is the value of the second control signal, A1(n), A2(n), A3(n) and A4(n) are first constants for each multiplication factor a(n) and n lies in a range from 0 to N−1 inclusive; and wherein said variable equalizer means further comprises memory means for storing at least a number of the first constants.

3. The apparatus as claimed in claim 2, wherein said multiplication factor calculating means is further adapted to determine the multiplication factors a(n) in accordance with the following relationship:

a(n)=B1(n)+B2(n)*HF+B3(n)*PHI+B4(n)*HF*PHI, for PHI having a value lying in a second value range not overlapping the first value range, where B1(n), B2(n), B3(n) and B4(n) are second constants for each multiplication factor a(n); and wherein said memory means is adapted to store at least a number of the second constants.

4. The apparatus as claimed in claim 3, wherein said multiplication factor calculation means is further adapted to determine the multiplication factors a(n) in accordance with the following relationship:

a(n)=C1(n)+C2(n)*HF+C3(n)*PHI+C4(n)*HF*PHI, for PHI having a value lying in a third value range not overlapping the first and the second value range, where C1(n), C2(n), C3(n) and C4(n) are third constants for each multiplication factor a(n); and said memory means is further adapted to store at least a number of the third constants.

5. The apparatus as claimed in claim 2, wherein said multiplication factor calculating means is adapted to determine the multiplication factors a(n) in accordance with the following relationship:

a(n)=B1(n)+B2(n)*HF+B3(n)*PHI+B4(n)*HF*PHI, for PHI having a value lying in a second value range not overlapping the first value range, where B1(n), B2(n), B3(n) and B4(n) are second constants for each multiplication factor a(n); and wherein said memory means is adapted to store at least a number of the second constants.

6. The apparatus as claimed in claim 5, wherein said multiplication factor calculation means is further adapted to determine the multiplication factors a(n) in accordance with the following relationship:

a(n)=C1(n)+C2(n)*HF+C3(n)*PHI+C4(n)*HF*PHI, for PHI having a value lying in a third value range not overlapping the first and the second value range, where C1(n), C2(n), C3(n) and C4(n) are third constants for each multiplication factor a(n); and said memory means is further adapted to store at least a number of the third constants.

7. An apparatus for reproducing a digital signal which has been recorded on a track on a record carrier, the apparatus comprising:

read means for reading the recorded digital signal from the track;

equalizer control signal generator means for generating first and second control signals, the first control signal(HF) being related to high frequency losses in a magnitude transmission characteristic of a transmission path which includes the recording and reading of the digital signal, the second control signal (PHI) being related to a delay difference resulting from a phase transmission characteristic of said transmission path between low and high frequency portions of an operating frequency range thereof;

variable equalizer means for equalizing the magnitude and phase transmission characteristics of said transmission path in response to said first and second control signals, and supplying an equalized output signal which is a reproduction of said digital signal; said variable equalizer means being coupled to said read means to receive the digital signal read from the track and being further coupled to said equalizer control signal generator means to receive said first and second control signals therefrom; said variable equalizer means comprising:

(a) finite impulse response filter means which comprises:
  (i) delay line means having a number N of taps and which is in the form of a first delay line section having a number N1 of taps followed by a second delay line section having a number N–N1 of taps, each nth tap producing an nth tap output signal, where for the first delay line section $0 \leq n \leq N1-1$ and for the second delay line section $0 \leq n \leq N-N1-1$;
  (ii) multiplier means for multiplying each nth tap output signal from said first and second delay line sections by a multiplication factor a(n) and b(n), respectively, to produce a multiplied nth tap output signal; and
  (iii) combining means coupled to said multiplier means and having a first and a second signal combination section, the first signal combination section receiving and combining the multiplied signals present at the taps of the first delay line section and supplying the combined signals to the second delay line section, the second signal combination section receiving and combining the multiplied output signals present at the taps of the second delay line section and supplying the combined signals to an output of said variable equalizer means;

(b) multiplication factor generating means for generating the multiplication factors a(n) and b(n), comprising multiplication factor calculating means for determining:
  (i) at least a number of the N1 multiplication factors a(n) for the N1 output signals of said first delay line section, said determination being in accordance with the following relationship:

$$a(n)=A1(n)+A2(n)*HF$$

wherein n lies in a range from 0 to N1–1 inclusive, and
  (ii) determining at least a number of the N–N1 multiplication factors b(n) for the N–N1 output signals of said second delay line section, said determination being in accordance with the following relationship:

$$b(n)=A3(n)+A4(n)*PHI$$

for PHI having a value lying in a first value range, and wherein n lies in a range from 0 to N–N1–1 inclusive, A1(n) and A2(n) and A3(n) and A4(n) are first constants applicable to each multiplication factor a(n) and b(n), respectively; and (c) memory means for storing at least a number of said first constants.

8. An arrangement as claimed in claim 7, wherein said multiplication factor calculating means is adapted to determine the remaining multiplication factors b(n) for the N–N1 output signals of said second delay line section in accordance with the following relationship:

b(n)=B3(n)+B4(n)*PHI, for PHI having a value lying in a second value range not overlapping the first value range, where B3(n) and B4(n) are second constants for each multiplication factor a(b); and wherein said memory means is adapted to store at least a number of the second constants.

9. The apparatus as claimed in claim 8, wherein said multiplication factor calculating means is adapted to determine the remaining multiplication factors b(n) for the N–N1 output signals of said second delay line section in accordance with the following relationship:

b(n)=C3(n)+C4(n)*PHI, for PHI having a value lying in a third value range not overlapping the first and the second value range, where C3(n) and C4(n) are third constants for each multiplication factor b(n); and wherein said memory means is further adapted to store at least a number of the third constants.

10. The apparatus as claimed in claim 7, wherein said multiplication factor calculating means is adapted to calculate the remaining multiplication factors of the N1 multiplication factors for said first delay line section in accordance with the following relationship:

$$a(n)=A1(N1-1-n)+A2(N1-1-n)*HF$$

and to calculate the remaining multiplication factors of the N–N1 multiplication factors for said second delay line section in accordance with the following relationship:

$$b(n)=A3(N-N1-1-n)+A4(N-N1-1n)*\{2PHI_c-PHI\},$$

where $PHI_c$ is the value for PHI corresponding to the difference in delay in the variable equalizer means which equals zero.

11. An arrangement as claimed in claim 10, wherein said multiplication factor calculating means is further adapted to determine the multiplication factors b(n) for the N–N1 output signals of said second delay line section in accordance with the following relationship:

b(n)=B3(n)+B4(n)*PHI, for PHI having a value lying in a second value range not overlapping the first value range, where B3(n) and B4(n) are second constants for each multiplication factor a(b); and wherein said memory means is further adapted to store at least a number of the second constants.

12. The apparatus as claimed in claim 11, wherein said multiplication factor calculating means is further adapted to calculate the multiplication factors b(n) for the N–N1 output signals of said second delay line section in accordance with the following relationship:

b(n)=C3(n)+C4(n)*PHI, for PHI having a value lying in a third value range not overlapping the first and the second value range, where C3(n) and C4(n) are third constants for each multiplication factor b(n); and wherein said memory means is further adapted to store at least a number of the third constants.

* * * * *